(12) United States Patent
Esman (10) Patent No.: US 12,449,714 B2
(45) Date of Patent: Oct. 21, 2025

(54) PHOTONIC ANALOG-TO-DIGITAL CONVERTER (pADC) WITH PHOTONIC PHASE CORRECTION

(71) Applicant: Rockwell Collins, Inc., Cedar Rapids, IA (US)

(72) Inventor: Daniel J. Esman, Columbia, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1091 days.

(21) Appl. No.: 17/359,022

(22) Filed: Jun. 25, 2021

(65) Prior Publication Data

US 2025/0278011 A1    Sep. 4, 2025

(51) Int. Cl.
*G02F 7/00* (2006.01)
*G02F 1/35* (2006.01)
*H03M 1/12* (2006.01)
*H03M 7/00* (2006.01)

(52) U.S. Cl.
CPC .............. *G02F 7/00* (2013.01); *G02F 1/3546* (2021.01); *H03M 1/1245* (2013.01); *H03M 7/008* (2013.01)

(58) Field of Classification Search
CPC ...... G02F 7/00; G02F 1/3546; H03M 1/1245; H03M 1/121; H03M 7/008
See application file for complete search history.

(56) References Cited

U.S. PATENT DOCUMENTS

| 8,897,656 | B2 | 11/2014 | Curt et al. |
| 8,953,950 | B2 | 2/2015 | Nazarathy et al. |
| 10,735,128 | B1 | 8/2020 | Esman |
| 2014/0306807 | A1* | 10/2014 | Rowland ................. H04Q 9/00 340/10.3 |

FOREIGN PATENT DOCUMENTS

| DE | 602010014651 | 3/2014 |
| EP | 2467940 B1 | 10/2014 |
| EP | 1986352 B1 | 10/2016 |

* cited by examiner

*Primary Examiner* — Joseph J Lauture
(74) *Attorney, Agent, or Firm* — Suiter Swantz IP (57) ABSTRACT

A system and method for correcting environmental phase drift between signal and reference branches of a photonic analog-digital converter (pADC) with passive remote sampler (PRS) sends a continuous-wave (CW) laser from a base unit through the PRS in a reverse optical path to measure the phase drift. The CW optical signal is converted to an electrical signal from which a phase-error signal indicative of the phase drift is filtered out and sent to a phase shifter. The pADC sends an optical pulse through the PRS in a forward optical path; the signal pulse is phase-modulated according to a received radio frequency (RF) signal of interest. The phase-modulated optical pulses (e.g., signal and reference) are received at the base unit and the phase drift corrected out of the optical pulses via the phase shifter. The corrected optical pulses are demodulated to provide a digital counterpart to the RF signal of interest.

15 Claims, 5 Drawing Sheets

PHOTONIC ANALOG-TO-DIGITAL CONVERTER (pADC) WITH PHOTONIC PHASE CORRECTION

GOVERNMENT SUPPORT

This technology was developed with U.S. government support under contract number FA8650-19-C-1830 awarded by the Department of Defense. The U.S. government has certain rights in this invention.

BACKGROUND

A high-performance photonic analog-digital converter (pADC) can sample a radiofrequency (RF) source with an optical pulse and produce a digitized equivalent to the analog RF signal received therefrom. To do so, the pADC splits the optical pulse into a signal branch and a reference branch sent through separate optical fibers, of which only the signal branch is phase-modulated according to the RF signal of interest before recombination. However, temperature changes, vibrations, and other environmental factors may cause phase drift between the signal and/or reference branches, complicating the maintenance of absolute phase difference upon recombination. For example, the RF signal may alias down and overlap in frequency with the phase drift, making the two impossible to separate.

Conventional approaches to phase correction include the application of a dithering tone or signal and measuring in the digital domain the phase difference between signal and reference branches. This approach is not ideal in that a slow change in phase may overlap with the RF signal of interest; further, the dithering tone may reduce the frequency bandwidth being captured. In addition, the dithering tone requires an active powered component, which renders this approach incompatible with passive fiber remoting applications, e.g., where phase modulator components may be remotely located from the optical pulse source and other pADC components and optically coupled thereto by fibers or other like optical media.

SUMMARY

A photonic analog-digital converter (pADC), incorporating photonic phase correction is disclosed. In embodiments, the pADC includes a base unit and a passive remote sampler (PRS; e.g., an unpowered sampler that may be located remotely from the base unit) for receiving a radio frequency (RF) signal or other like analog signal of interest. The PRS splits an optical pulse into equivalent branches, phase-modulates one branch (e.g., a signal branch) according to the received RF signal, and recombines the modulated signal branch with the other branch (e.g., a reference branch) resulting in modulated optical output pulses. However, shifting environmental conditions (e.g., heat, vibrations) with respect to the PRS may impart environmental phase drift between the signal and reference branches. The base unit has a sending side and a receiving side, the receiving side configured for receiving the modulated optical output pulses. The receiving side measures the environmental phase drift by sending a continuous-wave (CW) laser through the PRS in a reverse optical path (e.g., through the same optical media, but in the opposite direction, as the optical pulse to be modulated). The sending side includes a source for the optical pulse (e.g., a mode locked laser (MLL)) and a photodetector for converting the CW laser (having traveled through the PRS) into an equivalent electrical signal. The receiving side includes a phase shifter which corrects the environmental phase drift from the modulated optical output pulses (e.g., from a signal branch or pulse thereof) based on the electrical signal.

In some embodiments, the PRS modulates the CW laser (e.g., a reference branch thereof, as the CW laser is likewise split into signal and reference branches) based on the received RF signal of interest, and the photodetector includes a low-band photodiode for filtering from the converted electrical signal a phase-error signal indicative of the environmental phase drift, and sending the phase-error signal to the phase shifter such that the phase shifter corrects a phase of the modulated optical output pulses (e.g., branch or pulse thereof) according to the phase-error signal.

In some embodiments, the photodiode filters out the phase-error signal from the converted electrical signal based on a frequency disparity between the phase-error signal and the received RF signal of interest (as the CW optical signal has been modulated by the RF signal).

In some embodiments, the base unit includes wavelength-division multiplexers (WDM) capable of separating or recombining the optical pulse and the CW laser based on a frequency disparity between the optical pulse and the CW laser.

In some embodiments, the frequency disparity between the optical pulse and the CW laser is at least 10 nm.

In some embodiments, the PRS includes optical combiners for separating the optical pulse (e.g., as well as the CW laser, in the opposite direction) into its signal and reference branches and for recombining the reference branch and the modulated signal branch into the modulated optical output pulses.

In some embodiments, the environmental phase drift (e.g., phase error) is associated with a phase difference or offset between the signal and reference branches.

In some embodiments, the receiving side includes a demodulator for digitizing the phase-corrected modulated optical output pulses to provide a drift-free digital equivalent signal to the received RF signal of interest.

A method for photonic phase correction of environmental phase drift in a photonic analog-digital converter (pADC) having a base unit and a passive remote sampler (PRS) is also disclosed. In embodiments, the method includes receiving an RF (e.g., analog) signal of interest via the PRS. The method includes sending, via the base unit, a continuous-wave (CW) laser or other like optical signal through the PRS in a reverse optical path. The method includes converting, via the base unit, the CW laser into an equivalent electrical signal at least partially indicative of the environmental phase drift. The method includes sending, via the base unit, an optical pulse through the PRS in a forward optical path (e.g., via the same optical media and components as the CW laser, but in the opposite direction). The method includes modulating, via a phase modulator of the PRS, the optical pulse according to the received RF signal of interest. The method includes correcting the environmental phase drift from the modulated optical output pulses (e.g., from a signal branch or pulse thereof) according to the converted electrical signal.

In some embodiments, the method includes modulating the CW laser according to the received RF signal of interest via the PRS. The method includes filtering an electrical phase-error signal from the converted electrical signal, the phase-error signal corresponding to the environmental phase drift.

In some embodiments, the method includes filtering the phase-error signal from the converted electrical signal based on a frequency disparity between the phase-error signal and the received RF signal of interest.

In some embodiments, the method includes converting the optical pulse into a signal branch and a reference branch, and recombining the phase-modulated signal branch and the reference branch to provide the modulated optical output pulses.

In some embodiments, the method includes separating the CW laser from the optical pulse (e.g., via wavelength-division multiplexers) based on a disparity in frequency between the CW laser and the optical pulse.

In some embodiments, the method includes providing a digital signal free of phase drift and corresponding to the received RF signal of interest by demodulating the phase-corrected modulated optical output pulses.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and system for correcting environmental phase drift in a pADC. Embodiments may provide correction of phase drift due to environmental effect while maintaining the capability for passive remote sampling, providing phase correction in the analog domain and allowing the use of low-loss components.

Figure 1:
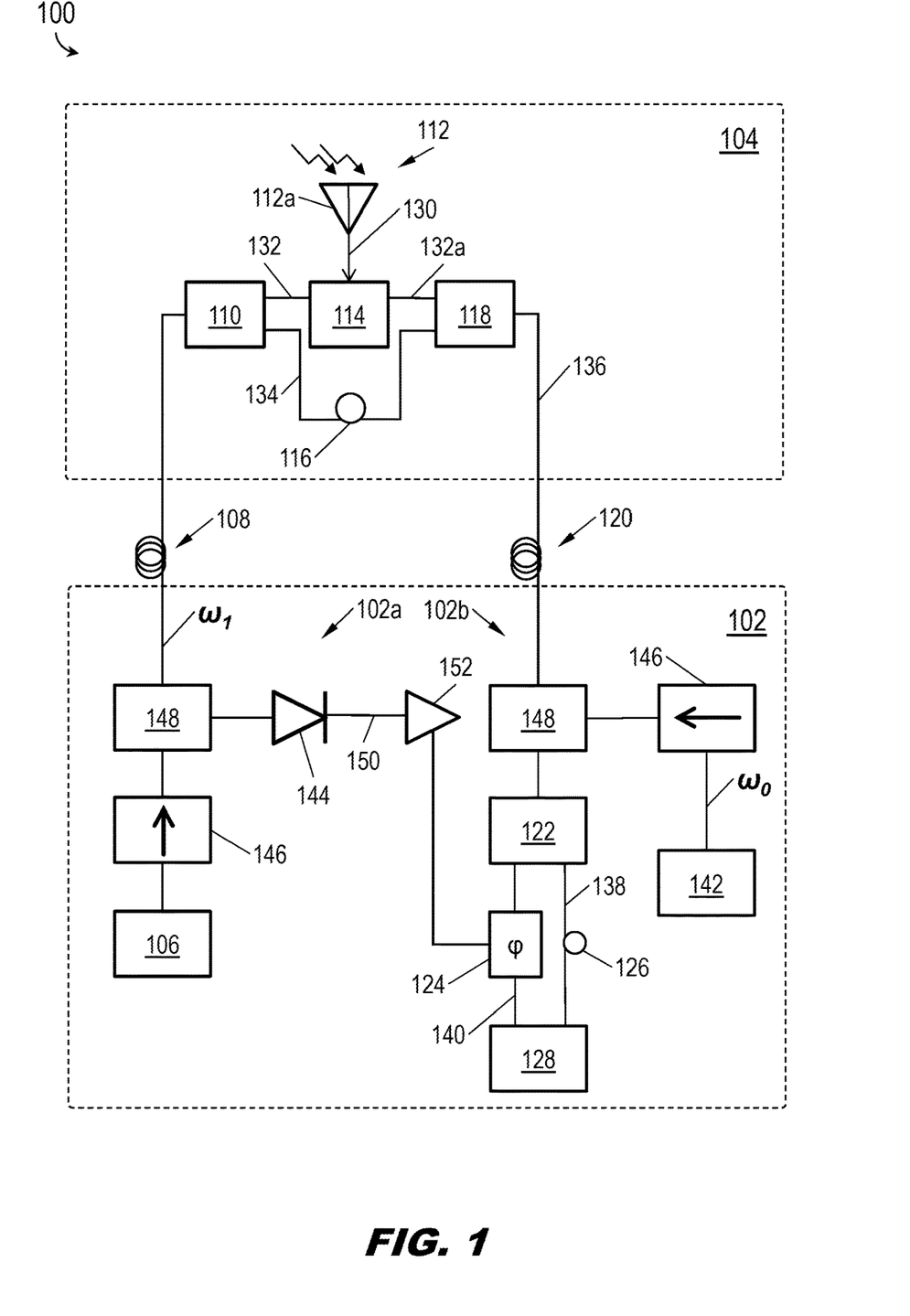
FIG. 1 is a diagrammatic illustration of a photonic analog-digital converter (pADC) in accordance with example embodiments of this disclosure.

Referring to FIG. 1, a photonic analog-digital converter 100 (pADC) according to the inventive concepts disclosed herein is shown. The pADC 100 may be implemented as a vehicle or other mobile platform (e.g., aircraft, spacecraft, watercraft, submersible, ground vehicle) or a fixed platform (e.g., at one or more fixed locations which may include a base unit 102 (e.g., base location) and a passive remote sampler 104 (e.g., remote location) at some distance from the base location).

In embodiments, the pADC 100 may include an optical pulse source 106 (e.g., mode-locked laser (MLL)), fiber optic link 108, optical coupler 110, radio frequency (RF) source 112, phase modulator 114 (PM), interleaving delay 116, optical coupler 118, fiber optic link 120, optical switch 122, phase shifter 124, optical delay 126, and coherent detector 128, some or all of which may be electronically and/or optically coupled (e.g., by at least one cable, fiber, or like electronic or optical media) at any given time.

In embodiments, the optical pulse source 106 may be utilized to sample an RF signal of interest 130 (e.g., or other analog signal) received at the RF source 112. The optical pulse source 106 may be configured to output an optical pulse ($\omega_1$) to the optical coupler 110 via the fiber optic link 108. The optical coupler 110 may be configured to split the optical pulse $\omega_1$ into a signal pulse 132 and a reference pulse 134 (e.g., replicate the optical pulse $\omega_1$ into two equivalent pulses). For example, the signal pulse 132 may be sent through the phase modulator 114, and the reference pulse 134 may be sent through the interleaving delay 116 to the optical coupler 118.

In embodiments, the RF source 112 may be configured to provide an RF signal of interest to the phase modulator 114. For example, the RF source 112 may include antenna elements 112a, a computing device, and/or receiver components electronically coupled to the phase modulator 114.

In embodiments, the phase modulator 114 may be implemented as an electro-optical (EO) phase modulator. For example, the phase modulator 114 may be configured to modulate the signal pulse 132 according to the RF signal of interest 130, e.g., by imprinting the RF signal of interest onto an optical phase of the signal pulse, and outputting the modulated signal pulse (132a) to the optical coupler 118. The interleaving delay 116 may be configured to impart a delay (e.g., a half period delay) into the reference pulse 134, allowing for time interleaving between the modulated signal pulse 132a and the reference pulse 134.

In embodiments, the optical coupler 118 may be configured to recombine the modulated signal pulse 132a and the reference pulse 134 into modulated optical output pulses 136 (e.g., a time-interleaved signal and reference pulse) transmittable via a single optical fiber. The modulated optical output pulses 136 may be transmitted back to the base unit 102 via the fiber optic link 120.

In embodiments, the optical switch 122 may be optically coupled to the passive remote sampler 104 (e.g., via the fiber optic link 120) and to the coherent detector 128. For example, the optical switch 122 may be configured to split the modulated signal pulse 132a and the interleaved reference pulse 134 into two respective optical paths 138, 140. The first optical path 138 may include the optical delay 126, such that the modulated signal pulse 132a is time-aligned with the interleaved reference pulse 134 when the modulated signal pulse and the interleaved reference pulse arrive at the coherent detector 128. The second optical path 140 may correct the phase drift from the reference pulse 134 via the phase shifter 124.

In embodiments, the coherent detector 128 (e.g., an in-phase/quadrature (I/Q) demodulator) may be optically coupled to the optical switch 122 via the optical paths 138, 140. The coherent detector 128 may be configured to receive the time-aligned modulated signal pulse 132a and interleaved reference pulse 134 and, by measuring the phase imprinted upon the modulated signal pulse 132a, provide a digitized equivalent to the RF signal of interest 130.

In embodiments, the base unit 102 may be characterized as having a sending side 102a and a receiving side 102b. For example, the sending side 102a may include the optical pulse source 106 configured for sending the optical pulse $\omega_1$ to the passive remote sampler 104 (e.g., in a forward optical path), and the receiving side 102b may receive the modulated optical output pulses 136 from the passive remote sampler (the modulated optical output pulses including the modulated signal pulse 132a and interleaved reference pulse 134). In embodiments, the passive remote sampler 104 may be characterized as "passive" in that the passive remote sampler incorporates no powered components, and "remote" in that the passive remote sampler may be remotely located from the base unit 102 (e.g., and connected thereto via the fiber optic links 108, 120).

It may be observed that, as noted above, the optical pulse $\omega_1$ may be split by the optical coupler 110 into the signal pulse 132 and reference pulse 134, which travel through different optical paths (e.g., and corresponding fibers or like optical media) before the modulated signal pulse 132a and interleaved reference pulse 134 are recombined into modulated optical output pulses 136 by the optical coupler 118. For example, the modulated signal pulse 132a may be phase-modulated (114) according to the RF signal of interest 130, and the resulting difference in phase between the modulated signal pulse 132a and interleaved reference pulse 134 may be measured (e.g., by the coherent detector 128) to provide a digital equivalent to the RF signal of interest. However, temperature changes, vibrations, and other environmental factors may introduce an additional phase drift, or phase error, between the signal pulse 132 and the reference pulse 134. For example, this phase drift may vary depending on the current environmental conditions at any given time. For the coherent detector 128 to accurately reconstruct the RF signal of interest 130 from the modulated signal pulse 132a and the interleaved reference pulse 134, this phase drift must be identified and corrected.

In embodiments, the pADC 100 may be configured to detect and correct phase drift via a continuous-wave (CW) laser 142 (e.g., or other like continuous-wave optical source). For example, the pADC 100 may further include a low bandwidth photodiode 144 (e.g., photodetector) on the sending side 102a of the base unit 102, as well as isolators 146 and wavelength-division multiplexers 148 (WDM) on both the sending and receiving sides 102a-b. In embodiments, the pADC 100 may measure environmental phase drift between the respective optical paths of the signal pulse 132 and reference pulse 134 via a CW optical signal $\omega_0$ generated by the CW laser 142 and sent in a reverse optical path (e.g., through the same optical media and components as the forward optical path of the optical pulse $\omega_1$, but in the opposite direction). For example, the optical signal Wo may detect the environmental phase drift (as described in greater detail below) and may be received at the sending side 102a as an optical signal at least partially indicative of the environmental phase drift. The photodiode 144 may convert this received optical signal into an equivalent electrical signal useful for correcting the environmental phase drift out of the modulated optical output pulses 136 (e.g., out of a signal branch or individual pulse thereof) prior to the arrival of the modulated optical output pulses at the coherent detector 128.

In embodiments, the isolators 146 on both the sending and receiving sides 102a-b of the base unit 102 may be configured to prevent the optical pulse $\omega_1$ and the CW optical signal $\omega_0$, configured to travel along opposing optical paths through the same optical media, from interfering with each other. Similarly, in some embodiments the optical pulse source 106 and the CW laser 142 may be configured to transmit at disparate frequencies (e.g., at least 10 nm apart, although the precise frequency difference may vary due to other system components or factors), such that the pADC 100 may incorporate low-loss and/or commercial off-the-shelf (COTS) WDMs 148 on both the sending and receiving sides 102a-b. For example, the WDMs 148 may provide for separation and/or combination of the optical pulse $\omega_1$ and the CW optical signal $\omega_0$ as needed or desired. In embodiments, at the sending side 102a, the WDM 148 may separate the CW optical signal $\omega_0$ from the optical pulse $\omega_1$ and send the CW optical signal $\omega_0$ to the photodiode 144. For example, the photodiode 144 may be a low bandwidth photodiode capable of 1) converting the CW optical signal $\omega_0$ to an equivalent electrical signal and 2) filtering, in the electrical domain, a phase-error signal 150 from the converted electrical signal (as described in detail below), the phase-error signal accurately indicative of the environmental phase drift. In embodiments, the phase-error signal 150 may be amplified (152) and sent to the phase shifter 124.

Figure 2A:
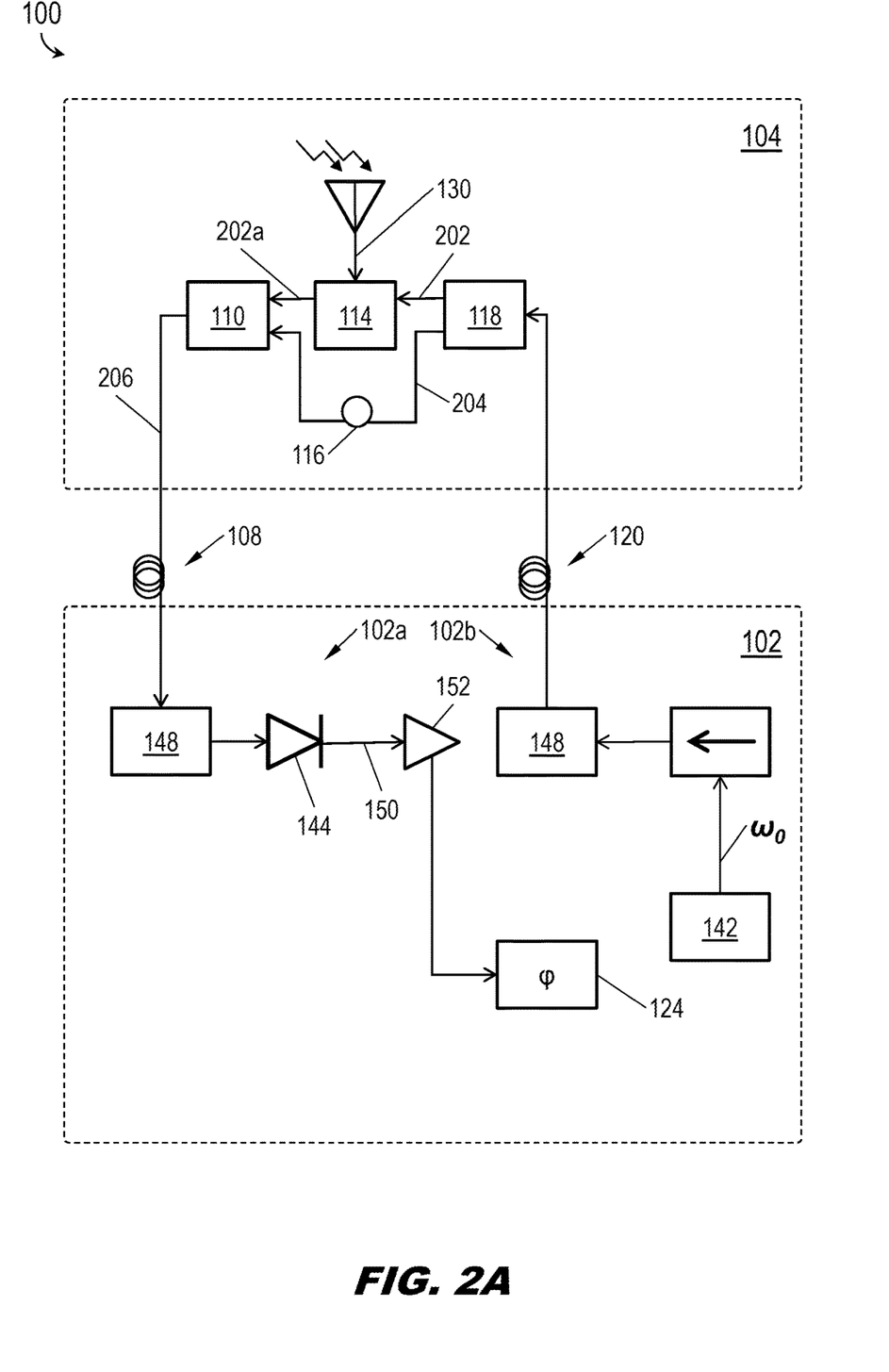
FIGS. 2A and 2B are diagrammatic illustrations of phase correction operations of the pADC of FIG. 1.

Referring now to FIG. 2A, the pADC 100 is shown.

In embodiments, the pADC 100 may measure environmentally driven phase drift between the optical paths corresponding to the signal pulse (132, FIG. 1) and reference pulse (134, FIG. 1) via a CW optical signal $\omega_0$ transmitted along a reverse optical path. For example, the CW laser 142 may transmit a CW optical signal $\omega_0$ (via the fiber optic link 120) through the passive remote sampler 104. The CW optical signal $\omega_0$ may be split into a CW reverse signal 202 and a CW reverse reference 204 (e.g., two equivalent branches) by the optical coupler 118.

In embodiments, the CW reverse signal 202 may be directed through the phase modulator 114 and phase-modulated (202*a*) according to the RF signal of interest 130. The CW reverse reference 204 may likewise be directed through the interleaving delay 116. The modulated CW reverse signal 202*a* and delayed CW reverse reference 204 may be recombined into a modulated CW optical signal 206 (e.g., via the optical coupler 110) and transmitted to the sending side 102*a* via the fiber optic link 108.

In embodiments, the modulated CW optical signal 206 may be separated from the optical pulse source ($\omega_1$, FIG. 1) by the sending-side WDM 148. The photodiode 144 may convert the modulated CW optical signal 206 into an equivalent electrical signal and, in the electrical domain, filter therefrom the electrical phase-error signal 150. For example, the modulation 202*a* of the CW reverse signal 202 according to the RF signal of interest 130 in the reverse optical path may be far weaker than a corresponding modulation (134*a*, FIG. 1) of a signal pulse (134, FIG. 1) in a forward optical path. Similarly, the RF signal of interest 130 and the electrical phase-error signal 150 may be sufficiently disparate in frequency that the electrical phase-error signal can be easily separated from the electrical signal by a photodiode 144 of low bandwidth. As noted above, the electrical phase-error signal 150 may be amplified (152) and sent to the phase shifter 124.

Figure 2B:
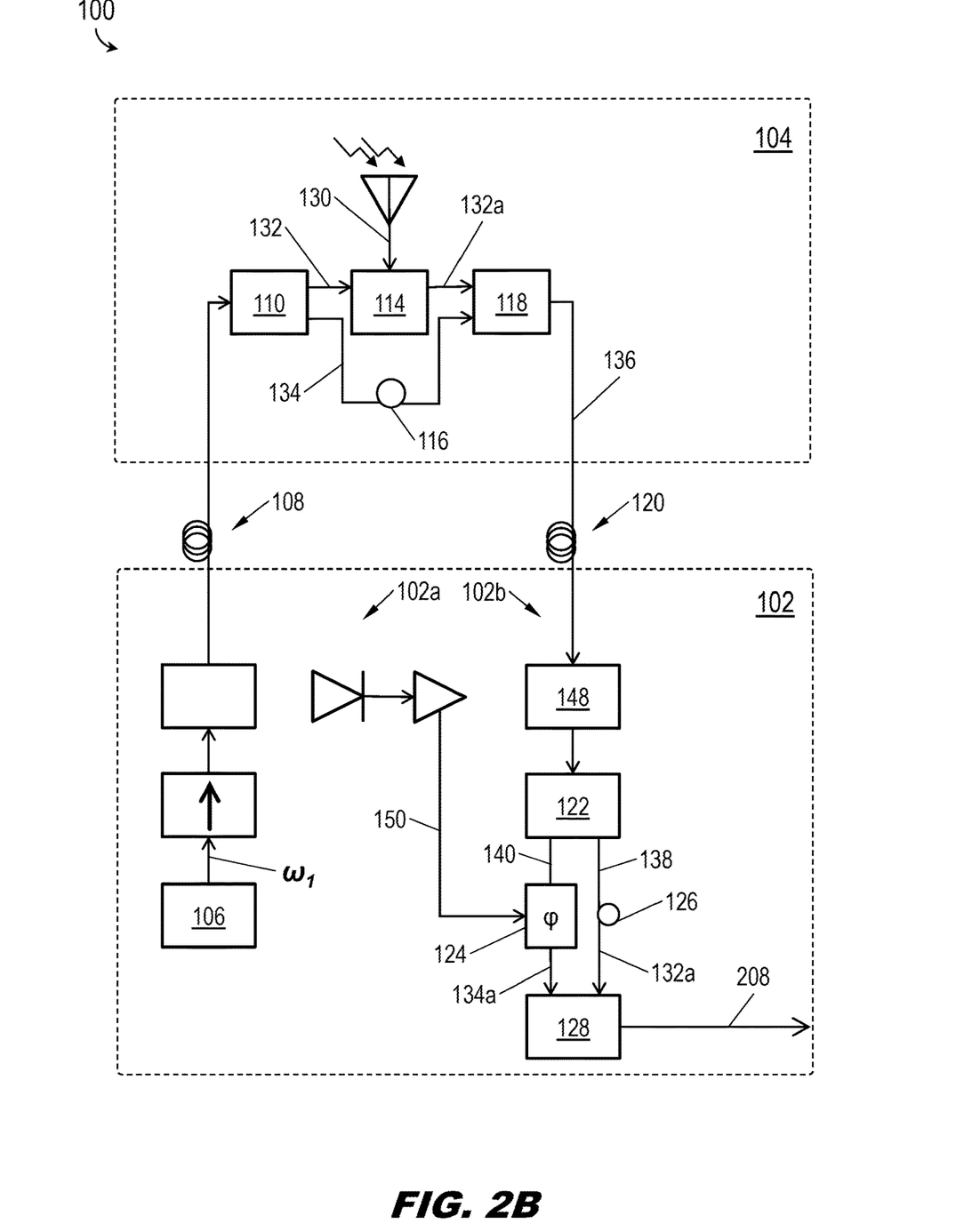

Referring also to FIG. 2B, the pADC 100 is shown.

In embodiments, the optical pulse source 106 may transmit the optical pulse $\omega_1$ through the passive remote sampler 104 via the fiber optic link 108. As noted above, the optical pulse $\omega_1$ may be split by the optical coupler 110 into the signal pulse 132 and reference pulse 134. The signal pulse 132 may be modulated (132*a*; via the phase modulator 114) according to the RF signal of interest 130, and the reference pulse 134 may be interleaved by the interleaving delay 116. The optical coupler 118 may recombine the modulated signal pulse 132*a* and interleaved reference pulse 134 into modulated optical output pulses 136 that incorporates the environmentally driven phase drift between the respective optical paths of the signal pulse and the reference pulse.

In embodiments, the modulated optical output pulses 136 may be sent to the receiving side 102*b* of the base unit 102 via the fiber optic link 120, and directed to the optical switch 122 via the receiving-side WDM 148. For example, the modulated optical output pulses 136 may be split into the modulated signal pulse 132*a* (sent to the coherent detector 128 via the optical path 138) and the interleaved reference pulse 134 (sent to the coherent detector via the optical path 140).

In embodiments, the modulated signal pulse 132*a* (in the optical path 138) may be time-aligned (via the optical delay 126) to align with the interleaved reference pulse 134. The interleaved reference pulse 134 (in the optical path 140) may be phase-shifted (134*a*; e.g., via the phase shifter 124) according to the electrical phase-error signal 150 to correct out the environmentally driven phase drift, and the phase-shifted reference pulse 134*a* sent to the coherent detector 128, arriving simultaneously with the time-aligned modulated signal pulse 132*a*.

In embodiments, the coherent detector 128 may measure the phase difference between the modulated signal pulse 132*a* (phase-modulated according to the RF signal of interest 130) and the phase-corrected reference pulse 134*a* to accurately construct a digital signal 208 equivalent to the RF signal of interest 130.

Figure 3:
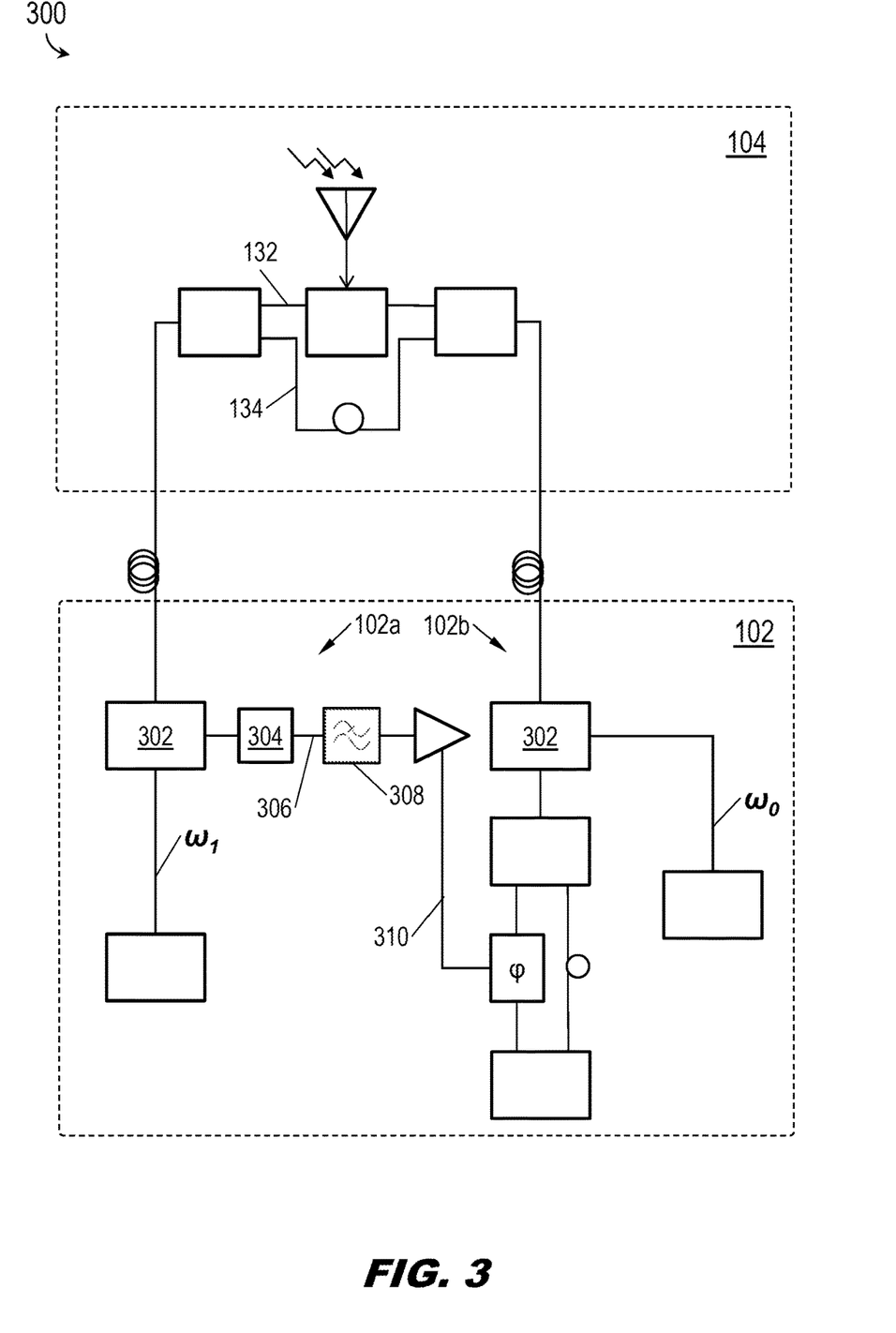
FIG. 3 is a diagrammatic illustration of the pADC of FIG. 1 incorporating one or more alternative components.

Referring to FIG. 3, the pADC 300 may be implemented and may function similarly to the pADC 100 of FIGS. 1 through 2B, except that the pADC 300 may incorporate one or more alternative components.

In embodiments, the base unit 102 of the pADC 300 may incorporate optical couplers 302 (or, e.g., optical circulators) for combining or separating the optical pulse $\omega_1$ and the CW optical signal $\omega_0$ on either the sending or receiving side (102*a*-*b*). For example, if the optical the optical pulse $\omega_1$ and the CW optical signal $\omega_0$ are not sufficiently disparate in frequency, the optical couplers 302 may be better suited for use than wavelength-division multiplexers (WDM; 148, FIG. 2A), although the optical couplers may be lossier compared to the WDM.

Similarly, in embodiments the pADC 300 may incorporate, instead of a low bandwidth photodiode (144, FIG. 1), a photodetector 304 for converting the CW optical signal $\omega_0$ received at the sending side 102*a* into an equivalent electrical signal 306 and a low pass filter 308 for filtering an electrical phase-error signal 310 from the equivalent electrical signal, the electrical phase-error signal indicative of environmental phase drift within the passive remote sampler 104 (e.g., based on a phase difference between the signal and reference paths 132, 134).

Figure 4:
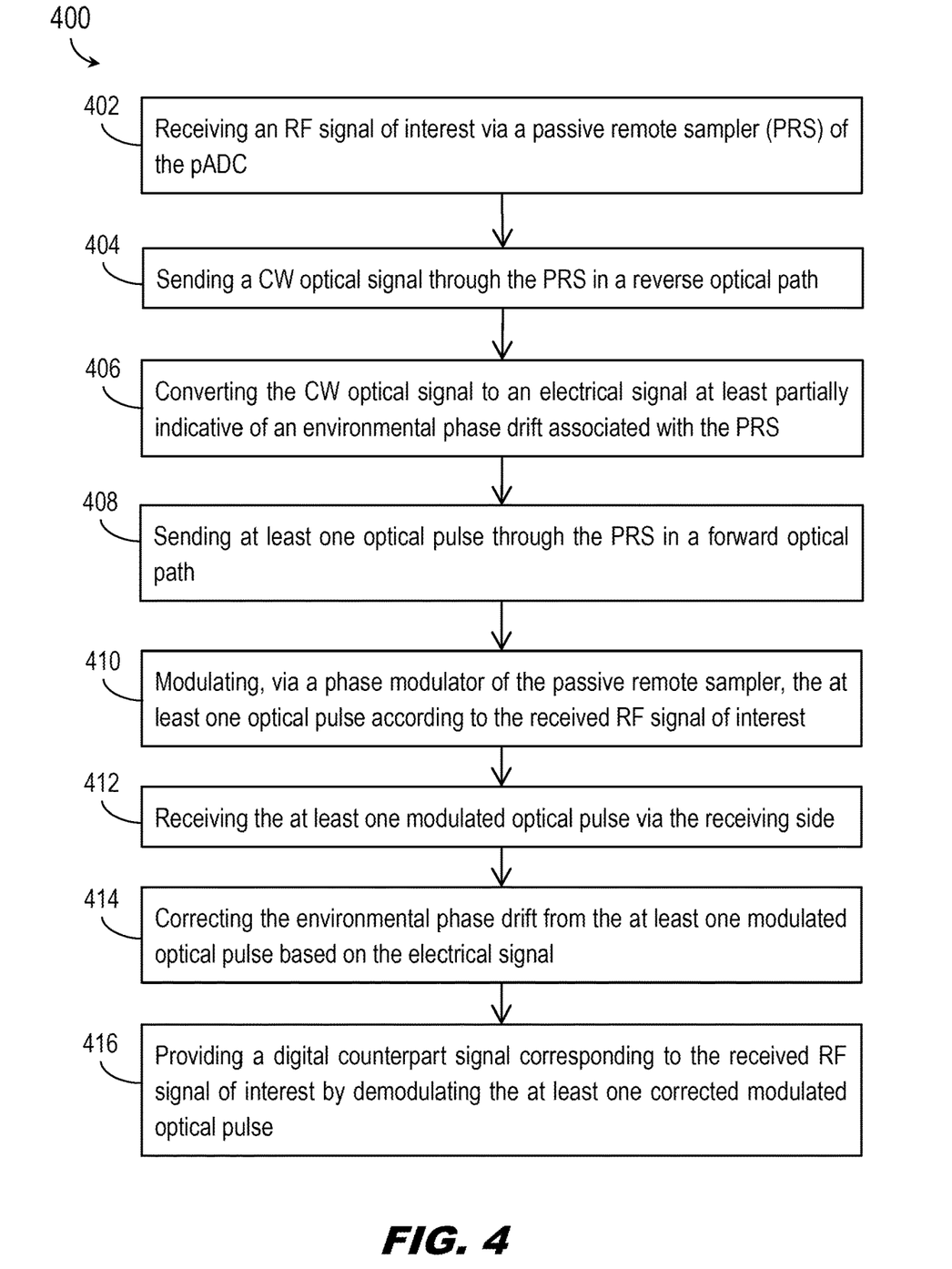
FIG. 4 is a flow diagram illustrating a method for photonic phase correction in a pADC according to example embodiments of this disclosure.

Referring now to FIG. 4, the method 400 may be implemented by embodiments of the pADC 100, 300 and may include the following steps.

At a step 402, the passive remote sampler (PRS) of the pADC receives an analog (e.g., radiofrequency (RF)) signal of interest.

At a step 404, a continuous-wave (CW) laser source measures environmentally driven phase drift between optical paths of the PRS by sending a CW optical signal in a reverse optical path (e.g., from the receiving side of the pADC base unit to the sending side) through the PRS.

At a step 406, the sending side of the pADC base unit converts the CW phase-error optical signal into an equivalent electrical signal, and filters from the electrical signal (in the electrical domain) a phase-error signal indicative of the environmental phase drift. For example, the CW optical signal is split into a signal branch and a reference branch; the signal branch modulated by the phase modulator within the passive remote sampler according to the RF signal of interest. The sending side of the base unit may include wavelength-division multiplexers (WDM) for separating the CW optical signal from an optical pulse sent through the PRS in the opposite direction, e.g., along a forward optical path (sending side to receiving side). In some embodiments, the CW optical signal is transmitted at a distinctly disparate frequency relative to the optical pulse, such that the CW optical signal can be separated from the optical pulse and directed by the WDM to the photodetector based on the disparate frequencies (e.g., 10 nm or more between the CW optical signal and the optical pulse).

At a step 408, a mode locked laser (MLL) or similar optical pulse source on the sending side of the base unit sends the optical pulse through the PRS (e.g., in a forward optical path). For example, the optical pulse may be split within the PRS into a signal pulse and a reference pulse; the environmental phase drift within the PRS may be reflected in the phase difference between the signal and reference pulses when the signal and reference pulses are recombined.

At a step 410, a phase modulator of the PRS phase-modulates the signal pulse according to the received RF signal of interest.

At a step 412, the modulated optical output pulses (e.g., the phase-modulated signal pulse recombined with an interleaved reference pulse) are received at the receiving side of the pADC base unit.

At a step 414, a receiving side phase shifter corrects the environmental phase drift from the received modulated optical output pulses (e.g., from a signal branch thereof) based on the electrical phase-error signal. For example, the phase shifter may receive the signal branch of the modulated optical output pulses from the PRS and the electrical phase-error signal (indicative of the environmental phase drift) from the sending side. The phase shifter adjusts the phase of the signal branch according to the phase-error signal; the phase-shifted signal branch and the other (e.g., reference) branch of the modulated optical output pulses are received by the coherent detector, resulting in phase-corrected modulated optical output pulses after demodulation.

In some embodiments, the method 400 may include an additional step 416. At the step 416, a receiving side coherent detector provides a digital counterpart signal corresponding to the received RF signal of interest (and free of environmental phase drift) by demodulating the phase-corrected modulated optical output pulses.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A photonic analog-digital converter (pADC), comprising:
a passive remote sampler (PRS) configured to:
receive at least one radio frequency (RF) signal of interest; and
modulate at least one optical pulse according to the received RF signal of interest;
a base unit having a sending side and a receiving side, the sending side and the receiving side both optically coupled to the PRS,
the receiving side configured to:
measure a phase drift associated with the PRS by sending a continuous-wave (CW) optical signal through the PRS in a reverse optical path;
and
receive the at least one modulated optical pulse via the PRS;
the sending side comprising:
an optical pulse source configured to transmit the optical pulse through the PRS in a forward optical path;
and
at least one photodiode configured to convert the CW optical signal into an electrical signal indicative of the phase drift;
and
the receiving side configured to:
receive the electrical signal from the sending side;
and
correct the phase drift associated with the at least one modulated optical pulse based on the electrical signal.

2. The pADC of claim 1, wherein:
the PRS is configured to modulate the CW optical signal according to the received RF signal of interest;
and
the at least one photodiode is configured to filter a phase-error signal corresponding to the phase drift from the electrical signal converted from the CW optical signal.

3. The pADC of claim 2, wherein the at least one photodiode is configured to filter the phase-error signal from the electrical signal based on a frequency disparity between the phase-error signal and the RF signal of interest.

4. The pADC of claim 1, wherein the base unit includes at least one wavelength division multiplexer (WDM) configured to separate the optical pulse and the CW optical signal based on a frequency disparity between the optical pulse and the CW optical signal.

5. The pADC of claim 4, wherein the frequency disparity between the optical pulse and the CW optical signal is not less than 10 nm.

6. The pADC of claim 1, wherein the PRS includes:
a first coupler configured to split the optical pulse into a signal branch and a reference branch, the signal branch to be modulated according to the received RF signal of interest;
and
a second coupler configured to recombine the modulated signal branch and the reference branch into the at least one modulated optical pulse.

7. The pADC of claim 6, wherein:
the phase drift is associated with a phase difference between the signal branch and the reference branch.

8. The pADC of claim 1, further comprising:
at least one demodulator configured to provide a digital counterpart signal corresponding to the received RF signal of interest by demodulating the at least one corrected modulated optical pulse.

9. A method for photonic phase correction in a photonic analog-digital converter (pADC), the method comprising:
receiving an RF signal of interest via a passive remote sampler (PRS) of the pADC;
sending a continuous-wave (CW) optical signal through the PRS in a reverse optical path;
converting the CW optical signal to an electrical signal at least partially indicative of an environmental phase drift associated with the PRS;

sending at least one optical pulse through the PRS in a forward optical path;

modulating, via a phase modulator of the PRS, the at least one optical pulse according to the received RF signal of interest;

and correcting, via a receiving side of a base unit optically coupled to the PRS, the environmental phase drift from the at least one modulated optical pulse based on the converted electrical signal.

10. The method of claim 9, wherein the pADC includes a base unit optically coupled to the PRS, and:

sending the continuous-wave (CW) optical signal through the PRS in a reverse optical path includes sending the continuous-wave (CW) optical signal through the PRS via the receiving side of the base unit;

and converting the CW optical signal to the electrical signal includes converting the CW optical signal to the electrical signal via a sending side of the base unit.

11. The method of claim 9, wherein:

sending the continuous-wave (CW) optical signal through the PRS in a reverse optical path includes modulating the CW optical signal according to the received RF signal of interest;

and converting the CW optical signal to the electrical signal indicative of the environmental phase drift of the PRS includes filtering a phase-error signal corresponding to the environmental phase drift from the converted electrical signal.

12. The method of claim 11, wherein filtering the phase-error signal corresponding to the environmental phase drift from the converted electrical signal includes:

filtering a phase-error signal corresponding to the environmental phase drift from the converted electrical signal based on a frequency disparity between the phase-error signal and the received RF signal of interest.

13. The method of claim 9, wherein:

sending at least one optical pulse through the PRS in a forward optical path includes splitting the at least one optical pulse into a signal branch and a reference branch;

and the environmental phase drift is associated with a phase difference between the signal branch and the reference branch.

14. The method of claim 9, wherein converting the CW optical signal to an electrical signal indicative of an environmental phase drift of the PRS includes:

separating the CW optical signal from the at least one optical pulse based on a frequency disparity between the CW optical signal and the at least one optical pulse.

15. The method of claim 9, further comprising:

providing a digital counterpart signal corresponding to the received RF signal of interest by demodulating the at least one corrected modulated optical pulse.

* * * * *